United States Patent [19]
Guest

[11] Patent Number: 5,934,713
[45] Date of Patent: Aug. 10, 1999

[54] COUPLING DEVICES

[76] Inventor: John Derek Guest, "Iona", Cannon Hill Way, Bray, Maidenhead, Berkshire, United Kingdom, SL6 2EX

[21] Appl. No.: 08/927,234

[22] Filed: Sep. 10, 1997

[30] Foreign Application Priority Data

Sep. 11, 1996 [GB] United Kingdom ............... 9618922

[51] Int. Cl.[6] .................................................. F16L 37/084
[52] U.S. Cl. ......................... 285/322; 285/323; 285/423
[58] Field of Search .................................. 285/243, 322, 285/323, 423

[56] References Cited

U.S. PATENT DOCUMENTS

| | | | |
|---|---|---|---|
| 5,042,848 | 8/1991 | Shiozaki | 285/323 |
| 5,443,289 | 8/1995 | Guest | 285/39 |
| 5,580,099 | 12/1996 | Eaton | 285/322 |
| 5,607,193 | 3/1997 | Guest | 285/308 |
| 5,799,988 | 9/1998 | Yeh | 285/323 |

FOREIGN PATENT DOCUMENTS

| | | |
|---|---|---|
| 0 756 125 A1 | 1/1997 | European Pat. Off. . |
| 756125 | 1/1997 | European Pat. Off. ............... 285/322 |
| 669442 | 3/1989 | Switzerland ............................ 285/322 |
| 180804 | 6/1922 | United Kingdom ................... 285/322 |
| 94021953 | 9/1994 | WIPO .................................... 285/322 |

*Primary Examiner*—Eric K. Nicholson
*Attorney, Agent, or Firm*—Baker & Daniels

[57] ABSTRACT

The disclosure relates to a collet for locating a tube in a throughway of a coupling body. The collet includes an annular flange having a central opening for a tube and a plurality of axially extending legs, each having a detent at its distal end for locking between the coupling body and tube. A plurality of slots are formed in the annular head corresponding in profile to axial projections of the detent profiles on the annular head for elements of the tooling required for molding the sides of the detents adjacent the annular head.

9 Claims, 3 Drawing Sheets

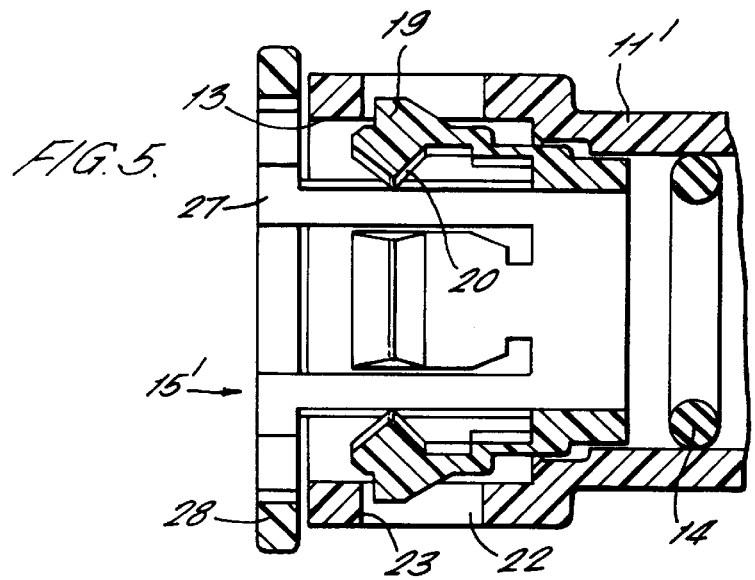
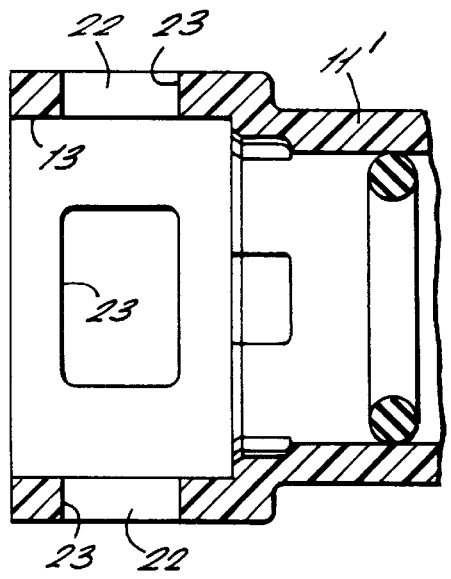
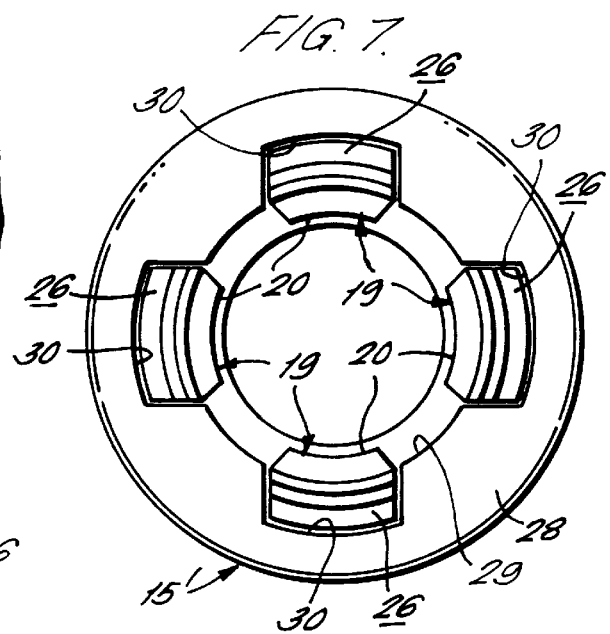
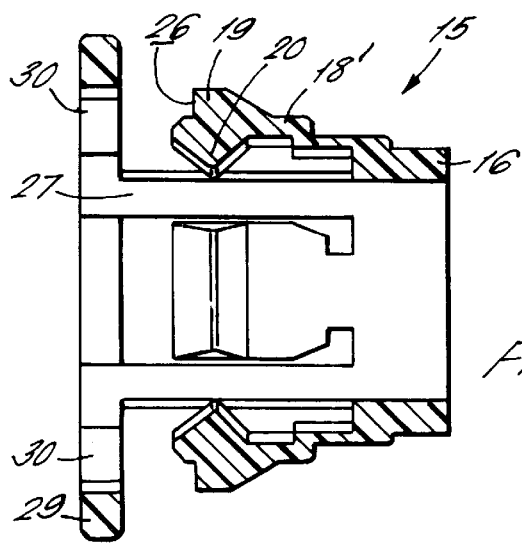

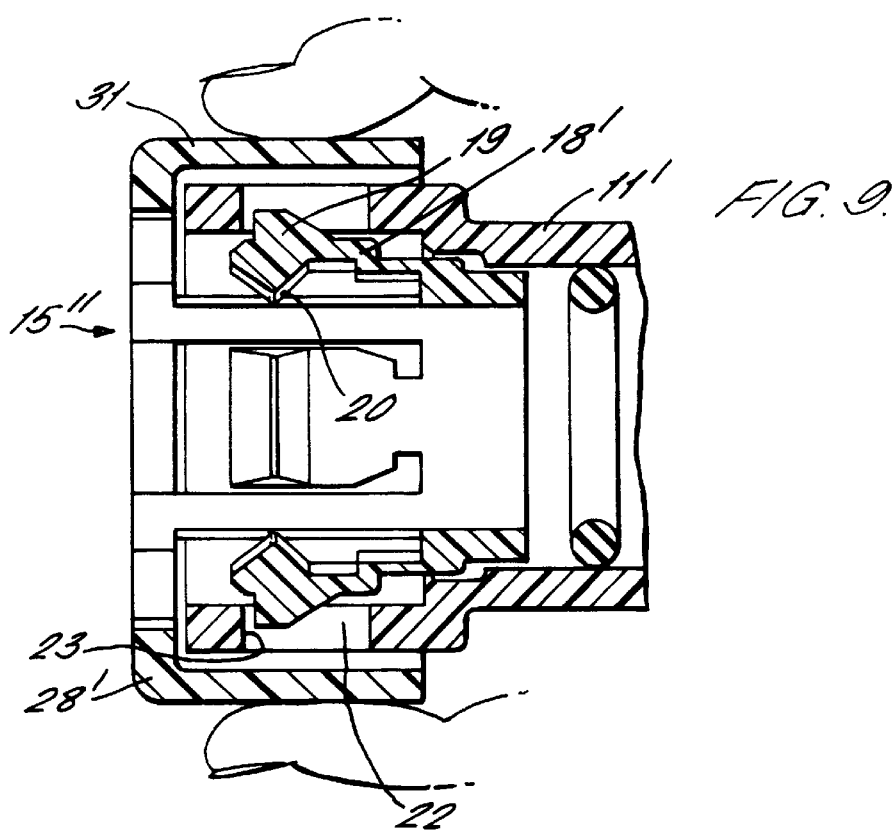
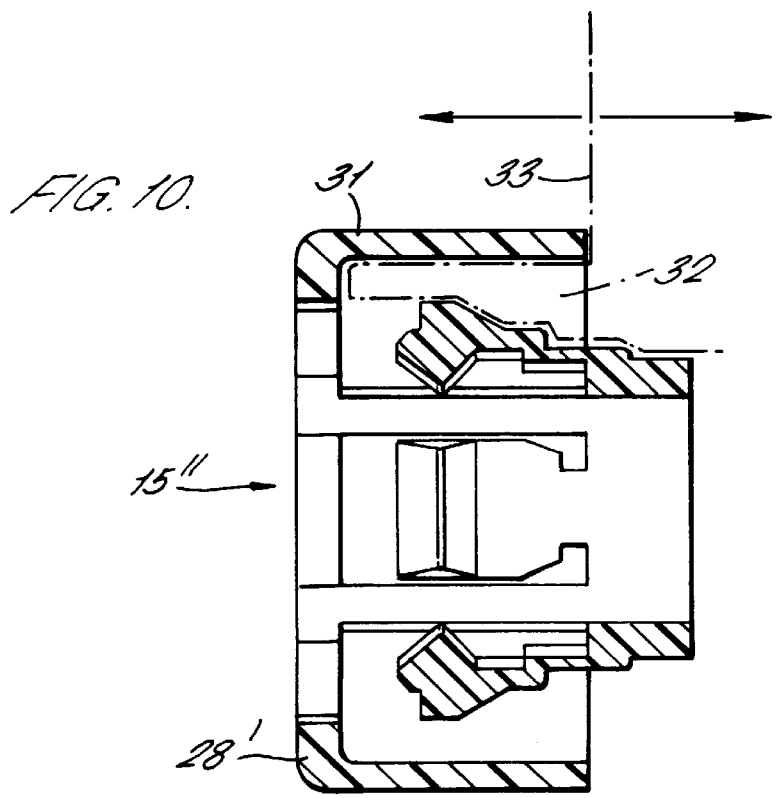

COUPLING DEVICES

BACKGROUND OF THE INVENTION

1. Field of the Invention

This invention relates to collets for tube couplings and is concerned with certain further improvements to the collets described and illustrated in my European Patent Publication No. 0756125 (U.S. Ser. No. 08/687744).

2. Background Prior Art

In European Patent Publication No. 0756125 tube couplings are described which comprise a coupling body having a throughway open at one end to receive a tube, a collet located in the throughway having an annular element and at least one radially resilient finger extending axially from the element towards said open end of the throughway. The coupling body has a stop face directed along the throughway axis away from said open end and the distal end of the finger has on its inner side a projection to engage a feature on the tube and on its outer side an axially facing abutment directed towards the open end of the throughway to engage with the stop face and a further radially facing abutment to constrain the distal end of the finger against radial outward movement and thereby to prevent release of the projection on the finger from the feature on the tube and release of the tube from the coupling body. In one particular arrangement, the collet has an extension projecting from the open end of the coupling body and formed with an annular head overlying the end of the coupling body around the open end of the throughway. The head can be depressed towards the end of the coupling body to release the first abutment of the collet finger from the stop face on the coupling body to allow the tube to be extracted from the coupling body.

SUMMARY OF THE INVENTION

This invention provides a collet for locating a tube in a throughway of a coupling body, the collet including an annular flange having a central opening for a tube and a plurality of axially extending legs, each having a detent at its distal end for locking between the coupling body and tube, and a plurality of slots in the annular head corresponding in profile to axial projections of the detent profiles on the annular head for elements of the tooling required for moulding the sides of the detents adjacent the annular head.

In one arrangement according to the invention the arms of the collet extend axially from the annular flange at spaced locations around the central opening and the arcuate slots are formed in the flange on the outside of the arms opposite the detents at the distal ends of the arms.

In an alternative arrangement the axially extending arms are formed integrally with a sleeve or collar and legs extend axially from the sleeve between the arms and said annular flange is formed integrally with the ends of the legs which are spaced around the central opening in the flange and the slots in the flange are formed around the opening between the legs opposite the detents on the arms for tooling to form the faces of the detents adjacent the annular head.

In the latter case the annular flange may have an integral sleeve encircling the collet to extend outside the coupling body for manual movement of the collet between locking and released positions.

BRIEF DESCRIPTION OF THE DRAWINGS

The following is a description of some specific embodiments of the invention, reference being made to the accompanying drawings in which

FIG. 5 is a sectional view through a further form of tube coupling in accordance with the invention;

FIG. 6 is a sectional view through the coupling body of the tube coupling of FIG. 5;

FIG. 7 is an end view of the collet for the tube coupling at FIG. 5;

FIG. 8 is a sectional view of the collet shown in FIG. 7;

FIG. 9 is a sectional view through a still further form of tube coupling in accordance with the invention; and FIG. 10 shows the collet of FIG. 9 with part of the tooling moulding the collet shown in chain line.

DESCRIPTION OF THE PREFERRED EMBODIMENTS

Figure 1:
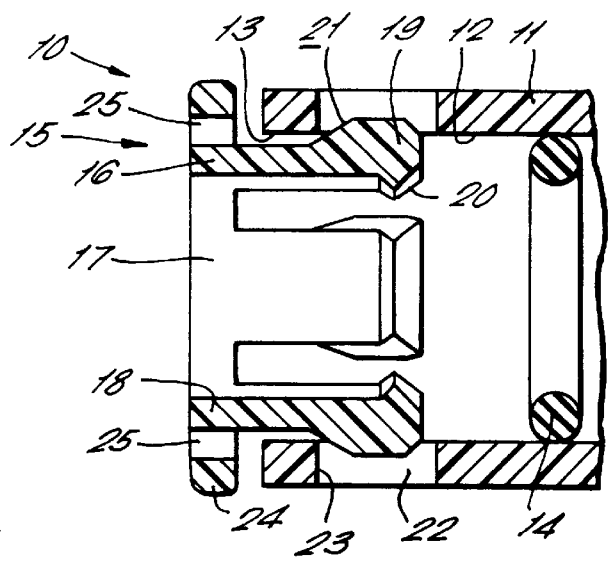
FIG. 1 is a sectional view through a tube coupling having a coupling body and tube locking collet.
Figure 2:
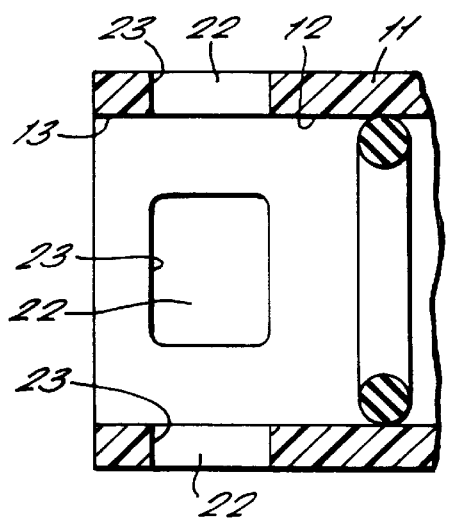
FIG. 2 is a sectional view through a part of the coupling body with a collet removed.
Figure 3:
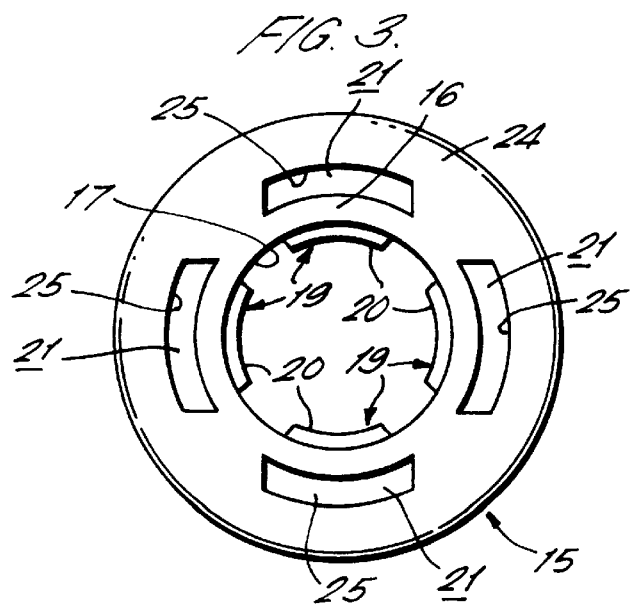
FIG. 3 is an end view of the collet.
Figure 4:
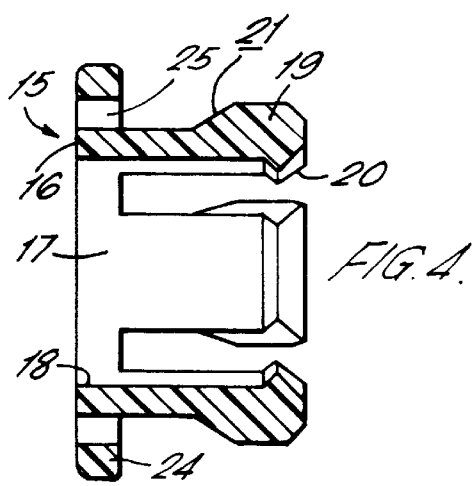
FIG. 4 is a sectional view through the collet.

Reference is made firstly to FIGS. 1 to 4 of the drawings which show a tube coupling indicated generally at 10 comprising a coupling body 11 having a throughway 12 open at one end 13 to receive an end portion of a tube not shown. An "O" ring seal 14 is mounted in the throughway for sealing engagement with the outer surface of the tube. A collet indicated generally at 15 is located in the open end of the throughway for locking the tube in the throughway. The collet comprises an annular sleeve or collar 16 having a central opening 17 and four equi-spaced resilient arms 18 formed integrally with the collar extending axially into the throughway. The arms have distal ends formed with enlarged heads 19 the inner sides of which have inwardly projecting teeth 20 to engage an annular abutment or recess formed on the tube to be locked in the coupling body. The outer sides of the arms have inclined cam faces 21 on the sides adjacent the collar.

The part of the coupling body adjacent the open end 13 is formed with four rectangular shaped ports 22 spaced around the throughway to receive the respective heads of the collet. The inclined cam surfaces 21 on the heads of the collet engage the sides 23 of the ports nearest the open end of the coupling body and movement of the collet outwardly of the throughway causes the cam faces 21 to drive the distal ends of the collet radially inwardly of the throughway to lock the teeth 20 on the inner sides of the collet arms firmly in engagement with the abutment or recess in the tube, thereby locking the tube in the coupling body.

The collar or sleeve 16 of the collet extending out of the coupling body throughway 12 is formed with an encircling integral annular flange 24 which is spaced from the end of the coupling body 11 when the detents or teeth 20 of the collet arms are in locking engagement with a tube in the coupling body, as indicated in FIG. 1. To release the teeth, the flange 24 of the collet is depressed towards the coupling body and this disengages the cam faces 21 of the collet arms from the sides 23 of the ports in the coupling body and allows the heads of the collet arms to be displaced outwardly into the ports thereby allowing the tube to be extracted from the collet and coupling body. Equally, when engaging a tube in the coupling body, the flange 24 of the collet can be drawn outwardly of the coupling body once the tube has been inserted to drive the heads of the collet arms inwardly by engagement of the cam faces 21 with the sides 23 of the ports 22 thereby locking the teeth 20 firmly in engagement with the tube.

For ease of moulding the collet and in particular the faces 21 of the heads of the collet the flange 24 of the collet is formed with arcuate slots 25, each which corresponds in shape or profile to the profile of the axial projection of the cam side face 21 on the flange 24. Thus one part of the tooling can include elements which extend through the slots 25 to form the cam faces 21. As a result, the collet can be formed between two axially separable tool components without the need for any component having to collapse or move radially for extraction of the moulding from the tooling.

FIGS. 5 to 7 show a further form of collet in accordance with the present invention suitable for use in the tube coupling described and illustrated in European Patent Publication No. 0756125. Like parts have been given the same reference numerals. In the embodiment described above, the annular collar or sleeve of the collet was located outside the coupling body and the resilient arms 18 of the collet extended axially into the coupling body. In the embodiment of FIGS. 5 to 8, the collar or sleeve is located within the coupling body and the resilient arms 18' of a collet 15 project towards the open end of the coupling body. The arms have detent heads 19 formed with inwardly projecting teeth 20 to engage the tube and outwardly projecting stepped abutments 26 to engage in the ports 22 formed in the coupling body 11. Reference should be made to my European Patent Publication No. 0756125 for a more detailed description of the operation of the detents.

Between the resilient arms 18', the collar or sleeve 16 has axially extending legs 27 which, when the collet and coupling body are assembled, project from the open end 13 of the coupling body and are formed integrally with an outer annular flange 28 corresponding to the annular flange 24 of the first embodiment. The flange 28 has a central opening 29 for a tube to be inserted through the collet into the coupling body and has arcuate slots 30 at spaced locations around the flange disposed axially opposite the heads 19 of the collet arms for access for tooling to form the faces of the heads directed towards the flange 28. Thus, again, the collet can be formed between relatively simple two-part tooling which is axially separable.

FIGS. 9 and 10 show a variant of the collet of FIGS. 5 to 8 in which the flange 28' has an integral skirt or sleeve 31 which extends around the part of the coupling body adjacent the open end in which the ports 22 are formed and provides a hand hold for easy manipulating of the collet between its released and engaged positions as illustrated.

FIG. 10 of the drawings show part of the mould tooling for forming the collet of FIG. 9, illustrated at 32, and the centre line 33 depicts the split line of the mould.

I claim:

1. A collet for locating a tube in a throughway of a coupling body, said collet including an annular flange having a central opening for a tube and a plurality of axially extending arms, each said arm attached to said collet and having a head at its distal end which engages both the coupling body and the tube, each said head having a side facing said flange, said flange having a plurality of slots, each said slot axially aligned with a said head, each said slot having a profile which corresponds to an axial projection of the profile of the said head aligned therewith, whereby the tooling element required for molding a said flange facing head side axially extends through a said aligned slot.

2. A collet as claimed in claim 1, wherein the arms of said collet extend axially from said annular flange at spaced locations around said central opening and said slots are formed in the flange radially outside of said arms and axially opposite said heads at the distal ends of said arms.

3. A collet as claimed in claim 1, wherein said axially extending arms are formed integrally with a sleeve or collar and legs extend axially from said sleeve or collar between said arms, and said annular flange is formed integrally with the ends of legs which are spaced around said central opening in said flange and said slots are formed around said central opening between said legs and axially opposite said heads on said distal ends for tooling to form said flange facing sides of said heads.

4. A collet as claimed in claim 3, wherein said annular flange has an integral sleeve encircling said collet said integral sleeve extending outside the coupling body whereby said collet is moved between locking and released positions through said sleeve.

5. A collet as claimed in claim 2, wherein said slots are arcuate.

6. A collet as claimed in claim 1, wherein said head is engaged with the coupling body and the tube.

7. A collet as claimed in claim 1, wherein each said flange facing head side is provided with an inclined cam face, whereby the collet engages the coupling body.

8. A collet as claimed in claim 1, wherein each said flange facing head side is provided with an abutment, whereby the collet engages the coupling body.

9. A collet as claimed in claim 1, wherein each said head is provided with a radially inwardly directed tooth, whereby said collet engages the tube.

\* \* \* \* \*